(12) United States Patent
Terazawa et al.

(10) Patent No.: US 7,494,738 B2
(45) Date of Patent: Feb. 24, 2009

(54) FUEL CELL SEPARATOR AND METHOD OF MANUFACTURING THE SAME

(75) Inventors: Toshihisa Terazawa, Anjo (JP); Takashi Ito, Kariya (JP); Takao Matsui, Kanonji (JP); Yoshiaki Hirose, Mitoyo (JP)

(73) Assignees: Aisin Seiki Kabushiki Kaisha, Kariya-shi (JP); Toyo Tanso Co., Ltd., Osaka-shi (JP)

( * ) Notice: Subject to any disclaimer, the term of this patent is extended or adjusted under 35 U.S.C. 154(b) by 0 days.

(21) Appl. No.: 11/484,751

(22) Filed: Jul. 12, 2006

(65) Prior Publication Data
US 2007/0015038 A1 Jan. 18, 2007

(30) Foreign Application Priority Data
Jul. 14, 2005 (JP) ............................. 2005-205848

(51) Int. Cl.
*H01M 8/02* (2006.01)
*B32B 9/00* (2006.01)
*B29C 65/00* (2006.01)

(52) U.S. Cl. ........................... 429/38; 429/34; 428/408; 156/196

(58) Field of Classification Search .................. 429/38, 429/34; 428/408; 156/196
See application file for complete search history.

(56) References Cited

U.S. PATENT DOCUMENTS

2003/0162079 A1 8/2003 Ooma et al.

FOREIGN PATENT DOCUMENTS

| EP | 0 098 380 A1 | 5/2001 |
|---|---|---|
| EP | 1098380 A1 * | 5/2001 |
| EP | 1 246 284 A2 | 10/2002 |
| EP | 1 280 217 A2 | 1/2003 |
| JP | 10-3931 | 1/1998 |
| JP | 11-354138 | 12/1999 |
| JP | 2000-173630 | 6/2000 |
| JP | 2003-109622 | 4/2003 |
| WO | WO 2005/062407 A2 * | 7/2005 |

* cited by examiner

*Primary Examiner*—Dah-Wei Yuan
*Assistant Examiner*—Angela J. Martin
(74) *Attorney, Agent, or Firm*—Oblon, Spivak, McClelland, Maier & Neustadt, P.C.

(57) ABSTRACT

A method of manufacturing a fuel cell separator, includes the steps of: preparing a first sheet, which is formed with a main material containing, therein, expanded graphite material and binder, and a second sheet configured to face at least one of surfaces which are formed at an outer edge portion of the first sheet and; arranging the second sheet to contact with the at least one of surfaces which are formed at the outer edge portion of the first sheet; and forming a passage on the first sheet at the same time as pressure-bonding the first sheet and the second sheet by a pressurizing means.

17 Claims, 11 Drawing Sheets

FUEL CELL SEPARATOR AND METHOD OF MANUFACTURING THE SAME

CROSS REFERENCE TO RELATED APPLICATIONS

This application is based on and claims priority under 35 U.S.C. §119 with respect to Japanese Patent Application 2005-205848, filed on Jul. 14, 2005, the entire content of which is incorporated herein by reference.

FIELD OF THE INVENTION

This invention generally relates to a fuel cell separator and a method of manufacturing the same.

BACKGROUND

JP2000-173630A discloses a method of manufacturing a fuel cell separator. According to the manufacturing method, a kneaded mixture is prepared by mixing 80-95% by weight of scaly natural graphite powders or expanded graphite powders with 5-20% by weight of thermosetting resin containing not less than 65% nonvolatile matter. The kneaded mixture is granulated, and granulated pellets of 10-1000 μm diameters are filled in a molding container. The fillings in the molding container are then isotropically pressure-molded to a molded product of predetermined shape, and are thermally cured by a temperature ranging between 150° C. and 280° C.

JP2003-109622A discloses another method of manufacturing a fuel cell separator. According to this manufacturing method, a mixture composition, containing thermo plastic resin and graphite particles, is formed. The mixture composition is filled in a heated state into a cavity of a die, which has been preheated to a temperature not lower than a melting point of the thermoplastic resin. The mixture composition is melted and compressed uniformly at a predetermined pressure for forming. The mixture composition is then cooled to a temperature lower than a heat deflection temperature of the thermoplastic resin while the pressure is being applied to the die.

JP1999 (11)-354138A discloses a method of forming a ribbed separator for a fuel cell. According to the forming method, a mixture of expanded graphite granulated powders and thermosetting or thermoplastic resin is employed as a material. The mixture is hot-press molded by a die to a ribbed separator for a fuel cell.

JP1998 (10)-3931A discloses a method of forming a separator, according to which a primary material mixed with carbonic material and hydrophilic material is filled in a metal die and press molded to a separator.

The above-described fuel cell separator is required comprehensively to exhibit excellent gas shielding; excellent creep resistance; and low electric resistance (excellent electric conductivity). Especially, where an expanded graphite material, which has a low bulk density, is used, even if the expanded graphite material is pressure-molded, there may be limitations to improve gas shielding of the separator. Especially, a separator portion, which serves as an outer edge portion and has a thick plate thickness, exhibits a less compression amount than a separator portion having a thin plate thickness, at which passages are formed on a surface. Therefore, the separator portion having the thick plate thickness may not be able to be densified to a sufficient level, so that there may be limitations to improve gas shielding of the outer edge portion of the separator.

Furthermore, according to the above-described fuel cell separator, as illustrated in FIG. 18, a flat sheet 300 having two surfaces 301 and 302 oppositely arranged to each other is prepared for the purpose of manufacturing a separator 350. More specifically, the flat sheet 300 is compressed in a thickness direction by means of a pressurizing die, in such a manner that the sheet 300 is pressure molded to form recessed groove-like shaped surface passages 305, which direct flows of reactant gas. According to this method of manufacturing the separator 350, although the surface passages 305 can be formed on the sheet 300, outer edge portions 352 of the separator 350 exhibits a less compression amount than a separator portion 354 on which the surface passages 305 are formed. Therefore, the outer edge portions 352 are not densified to a sufficient level, therefore gas shielding of the outer edge portions 352 are less effective.

Therefore, if the outer edge portions 352 are loaded with a larger pressurizing force simply to exert a larger compression amount and to enhance their gas shielding, the compression amount of the separator portion 354, on which the surface passages 305 are formed, are further increased, which may cause cracks on the separator portion 354. In this case, a molding load applied to the sheet 300 may become excessively large. As described above, the conventional methods of manufacturing the fuel cell separator may not be considered to comprehensively satisfy characteristics required to the fuel cell separator, such as excellent gas shielding, high creep resistance, low electric resistance, and so on.

The present invention has been made in view of the above circumstances, and provides a method of manufacturing a fuel cell separator, by which the fuel cell separator comprehensively excels in assuring, therein, gas shielding, creep resistance and electric conductivity, and also provides the fuel cell separator.

SUMMARY OF THE INVENTION

According to an aspect of the present invention, a method of manufacturing a fuel cell separator, includes the steps of: preparing a first sheet, which is formed with a main material containing, therein, expanded graphite material and binder, and a second sheet configured to face at least one of surfaces which are formed at an outer edge portion of the first sheet; arranging the second sheet in contact with the at least one of surfaces which are formed at the outer edge portion of the first sheet; and forming a passage on the first sheet at the same time as pressure-bonding the first sheet and the second sheet by a pressurizing means.

According to another aspect of the present invention, a fuel cell separator includes: a first sheet formed with a main material containing, therein, expanded graphite material and binder and having a passage through which reactant gas flow; a second sheet formed with a main material containing, therein, expanded graphite material and binder and arranged to contact with at least one of surfaces which are formed at an outer edge portion of the first sheet. The first sheet and the second sheet are bonded together while the passage is being formed at the first sheet, by being pressurized by a pressurizing means. The passage acts for allowing the flow of a reactant gas, which generate electricity, therethrough.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
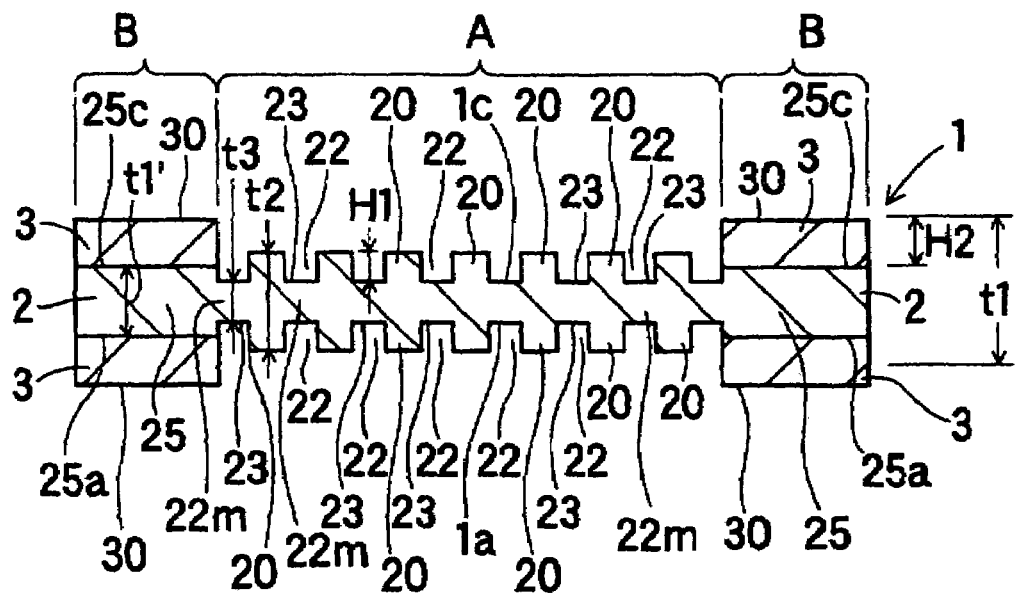
FIG. 1 is a cross sectional view illustrating a separator according to a first embodiment of the present invention.

Embodiments of the present invention are described herein with reference to FIGS. 1-18.

First Embodiment

A separator 1 with the maximum board thickness of t1 includes a first sheet 2 provided with surface passages 22 (a passage), of recessed groove-like shaped structure, which allows the flow of reactant gas (reactant fluid) therethrough, and second sheets 3 which are bonded to both surfaces 25a and 25c of outer edge portions 25 of the first sheet 2. The surfaces 25a and 25c are oppositely arranged to each other in a thickness direction. According to the first embodiment of the present invention, the thickness direction is a top-and-bottom direction of the drawing sheet of FIGS. 1 and 2, and yet alternatively, the thickness direction can be a right-and-left direction thereof.

The first sheet 2 includes protrusions 20 by which the surface passages 22 are formed, through which the flow of reactant gas, such as hydrogen gas or oxidant gas, is directed. The second sheets 3 each include a sealing surface 30 of flat shape. As illustrated in FIG. 1, a height H2, which is defined from the surface 25a or 25c to the sealing surface 30, is positioned to be higher than bottom surfaces 23 of the surface passages 22, and is also positioned to be higher than a height Hi, which is defined from the bottom surfaces 23 to the projections 20.

The first sheet 2 is produced with a main material including expanded graphite material and a binder, which combines the expanded graphite material. The second sheets 3 are produced in the same manner as the first sheet 2. As for the binder, thermoplastic resin is used, especially a material, such as PolyVinylidine DiFluoride (PVDF), Polyphenylene Sulfide (PPS) and so on, which exhibits higher heat resistance and is not easily decomposed under an operating atmosphere of a fuel cell. Expanded graphite material, which has not been pressure molded, exhibits high compressibility and high entangle ability.

Considering a proportion or compounding ratio of the expanded graphite and the binder, assuming a total content of the expanded graphite material and the binder in the mixture composition is 100% by weight, a content of the binder contained therein is ranged approximately between 20 and 40% by weight. Accordingly, the proportion or content of the expanded graphite material and the binder in the mixture composition can be adjusted as needed, and electric conductivity and mechanical strength of the separator 1 can be assured.

Figure 2:
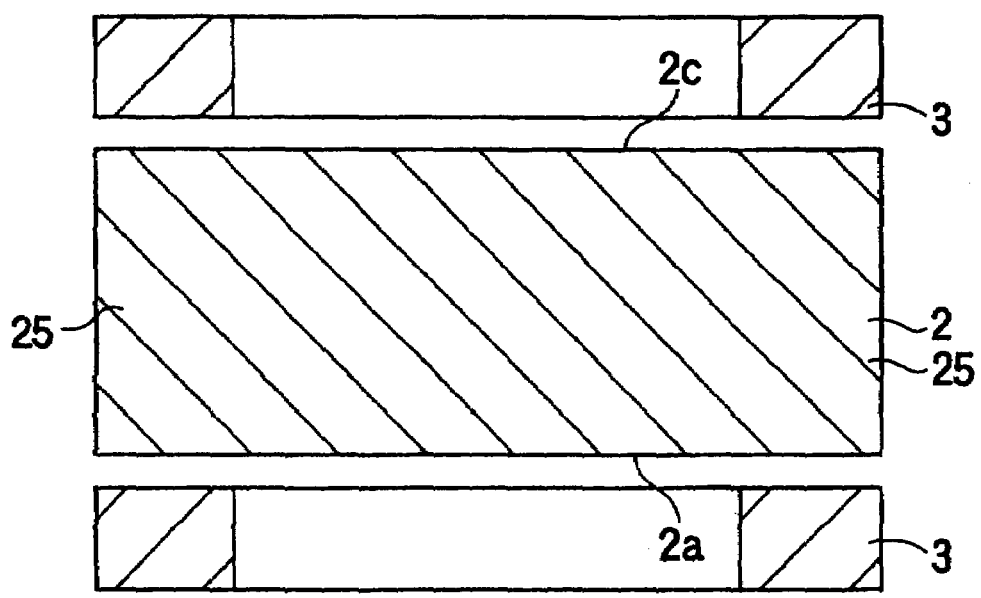
FIG. 2 is a cross sectional view illustrating a first sheet and second sheets, which compose the separator.

According to the first embodiment of the present invention, the separator 1 is manufactured as the follows. In the first place, a mixture of expanded graphite particles and binder particles, which combine the expanded graphite particles, is produced by means of a blender and so on. The mixture is rolling-molded so as to obtain the first sheet 2 (see FIG. 2) of plate shape and the second sheets 3 (see FIG. 2) of plate shape. As illustrated in FIG. 2, the first sheet 2 and the second sheets 3 both are single layers in thickness direction, and yet the first sheet 2 is of flat-plate shape and the second sheets 3 each are of frame shape.

As is apparent from FIG. 2, the first sheet 2 and the second sheets 3 are formed independently from each other. At this stage, the binder, which are contained in the first sheet 2 and the second sheets 3, have not been melt-solidified yet. Therefore, the binder contained therein are still particles. However, because the expanded graphite material, which is contained in the first sheet 2 and the second sheets 3, exhibits high bulk density and high mechanical entangle ability, these characteristics of the expanded graphite material will contribute to assuring handling ability of the first sheet 2, and the second sheets 3, which have not been thermally press-molded.

Figure 5:
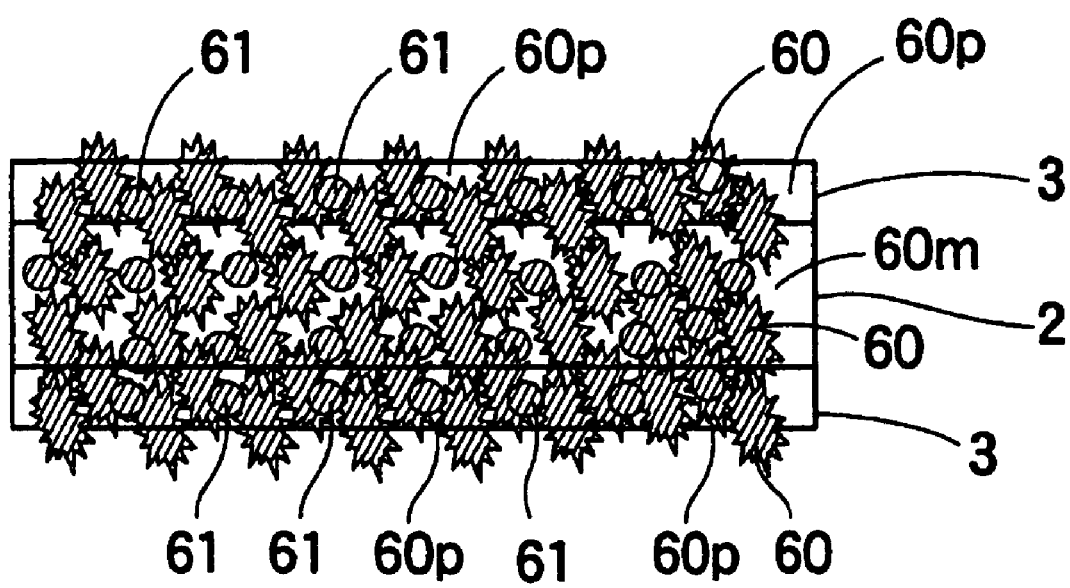
FIG. 5 is a cross sectional view schematically illustrating an internal structure of the first sheet and the second sheets, which have not been thermally press-molded.

As illustrated in FIG. 5, pore spaces 60m are easily created in expanded graphite particles 60 contained in the first sheet 2, and binder particles 61 are buried in these pore spaces 60m. Likewise, pore spaces 60p are easily created in the mixture of the expanded graphite particles 60 contained in the second sheets 3, and the binder particles 61 are buried in these pore spaces 60p.

According to the first embodiment of the present invention, prior to a thermal press-molding, the first sheet 2 and the second sheets 3 are respectively preheated by a heating means such as high-frequency heating or a heating plate and so on. The preheating is implemented outside a pressurizing die 4, as is obvious from FIG. 4. Because the first sheet 2 and the second sheets 3 include, therein, the great number of particles 60 of the expanded graphite material, even prior to that the first and second sheets 2 and 3 are melt-solidified by a thermal press-molding, the first sheet 2 and the second sheets 3 exhibit shape retaining property, good handling ability, and the preheating can be implemented outside the pressurizing die 4.

Figure 3:
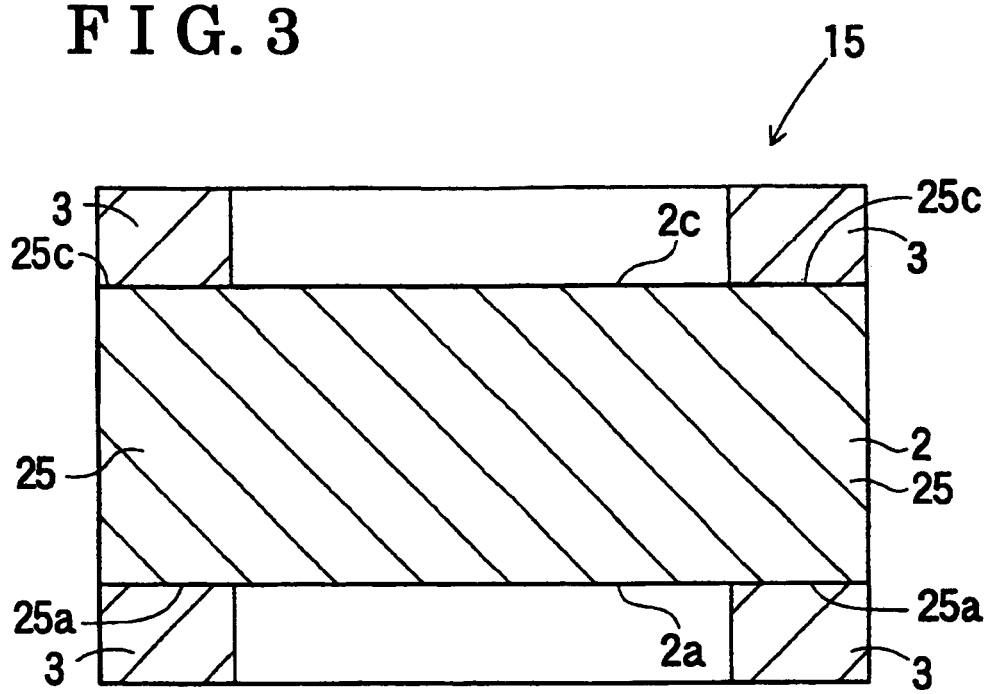
FIG. 3 illustrates a laminated product in which the first sheet and the second sheets, which have not been thermally press-molded, are laminated.

Described below is a laminating process. As illustrated in FIG. 3, a laminated product 15 is produced by laminating the frame-shaped second sheets 3 on the surfaces 25*a* and 25*c* of the outer edge portions 25 of the first sheet 2. In this circumstance, the pressurizing die 4 (see FIG. 4), which is a metal die and has been preheated to a predetermined temperature (e.g., 100-400° C.), is prepared as a pressurizing means, and the laminated product 15 is thermally press-molded in this thickness direction by the pressurizing die 4. The separator 1 is hence produced, which is a single laminated body of the first sheet 2 and the second sheets 3 bonded integrally.

Figure 4:
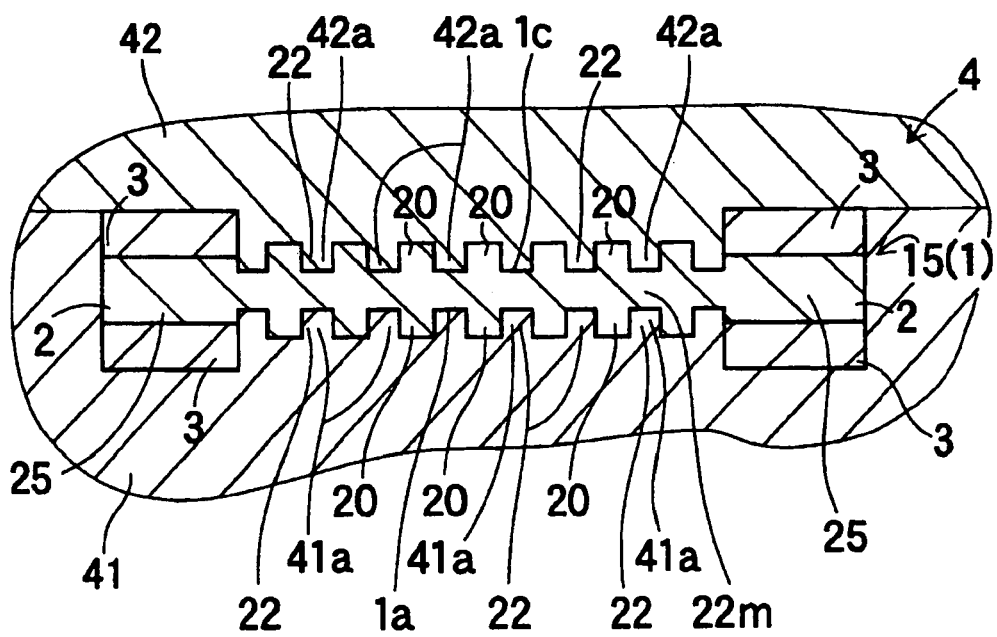
FIG. 4 is a cross sectional view schematically illustrating the laminated product which is thermally press-molded.

As we can see from FIG. 4, the pressurizing die 4 is made of a metal mold, and is provided with a first pressurizing die 41 (a base mold) having first protrusions 41*a* which are configured to pressurize the first sheet 2 and a second pressurizing die 42 (an upper mold) having second protrusions 42*a* which are configured to pressurize the first sheet 2. The first pressurizing die 41 and the second pressurizing die 42 are heated up by a heating source (not illustrated). The laminated product 15 is interposed between the first pressurizing die 41 and the second pressurizing die 42, and is applied with a clamping pressure by the first pressurizing die 41 and the second pressurizing die 42 which are approaching each other. Therefore, the surface passages 22, of recessed groove-like shaped structure, are formed on a surface 1*a* of the separator 1 by the first protrusions 41*a* of the first pressurizing die 41, while the surface passages 22 of recessed groove are formed on the other surface 1*c* of the separator 1 by the second protrusions 42*a* of the second pressurizing die 42. As a result, as illustrated in FIG. 1, the projections 20 are formed on the surface 1*a* of the separator 1 and adjacent to the surface passages 22. Likewise, the projections 20 are formed on the surface 1*c* of the separator 1 and adjacent to the surface passages 22.

Meanwhile, where a thermosetting resin is employed as a binder, it is necessary to thermally cure the thermosetting resin which has been loaded for a long period of time. In this case, such long loading time does not contribute to sufficient productivity. However, according to the first embodiment of the present invention, not a thermosetting resin is employed, but a thermoplastic resin is employed as a binder. In this case, it is sufficient that the thermoplastic resin is cooled down after having been melted once, and an operation, in which a long loading time for a thermal press-molding, can be omitted, thereby enabling to improve productivity of the separator 1. Otherwise, even if it is necessary to load the thermoplastic resin by the pressurizing die 4 for a thermal press-molding, the loading time for the thermoplastic resin can be shorter than that for the thermosetting resin.

Furthermore, according to the first embodiment of the present invention, the proportion or content of the expanded graphite material and the binder in the mixture composition is adjusted to an appropriate degree. It is hence possible to assure conductivity, gas shielding, mechanical strength, moldability of material, and releasability from the pressurizing die 4, which all are necessary for the separator 1. Especially, in order for the separator 1 to assure the electric conductivity appropriately, it is preferable that the proportion of the binder is fundamentally not greater than 40%, 35% and 30% by weight with respect to the mixture composition of the expanded graphite material and the binder of 100% by weight. Further, in order for the separator 1 to assure gas shielding in a thickness direction thereof, it is preferable that the proportion or content of the binder is fundamentally not less than 20%, 25% and 30% by weight with respect to the mixture composition of the expanded graphite material and the binder of 100% by weight. Therefore, the proportion or content of the binder is ranged approximately between 20 and 40% by weight. Accordingly, the proportions or contents, of the expanded graphite material, and of the binder in the mixture composition can be adjusted as needed, and as a result, electric conductivity, gas shielding, mechanical strength, moldability of material, and releasability from the pressurizing die 4, which all are required to the separator 1, can be assured appropriately.

According to the first embodiment of the present invention, the second sheets 3 are bonded to the outer edge portions 25 of the first sheet 2 having the surface passages 22 which allow the flow of reactant gas of the fuel cell therethrough. Therefore, while compression amount upon a thermal press molding is increased so that the separator 1 can exhibit high gas shielding, creep resistance, and mechanical strength, a required length in the thickness direction can be assured adjacent to the outer edge portions 25 of the separator 1. Therefore, it is possible to density the separator 1 by increasing the compression amount upon the thermal press molding, which is effective to obtain electric resistance at an appropriate level and to assure electric conductivity. As described above, the separator 1 according to the first embodiment comprehensively excels in gas shielding, creep resistance and electric conductivity.

Figure 6:
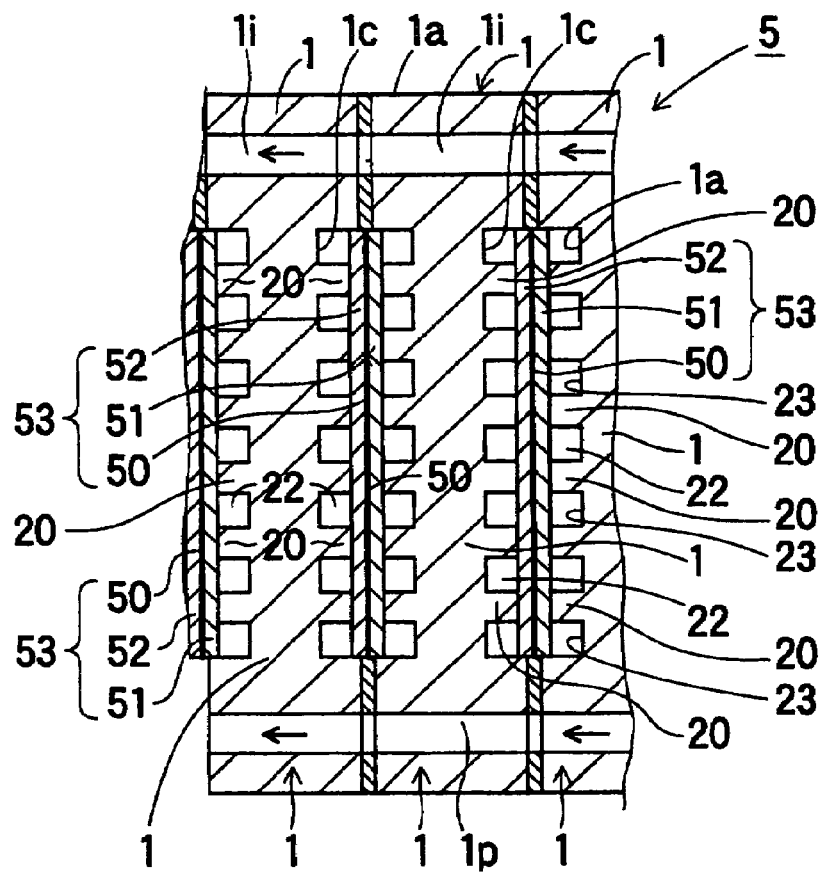
FIG. 6 is a cross sectional view schematically illustrating an internal structure of a fuel cell according to the first embodiment.

FIG. 6 is a cross sectional view illustrating the separator 1 applied to a polymer electrolyte fuel cell. The separator 1 is illustrated in FIG. 6, including the first sheet 2 and the second sheets 3. As illustrated in FIG. 6, the fuel cell 5 is basically composed of an "MEA" (electrolyte membrane-electrode assembly) having a fuel electrode 51, air electrode 52, and a polymer electrolyte membrane 50, which is disposed therebetween and a thin plate. The fuel electrode 51 usually comprises a gas diffusion layer which has both gas permeability and electronic conductivity and a catalyst layer which is positioned at the side of the polymer electrolyte membrane 50. Likewise, the air electrode 52 usually comprises a gas diffusion layer which has both gas permeability and electronic conductivity and a catalyst layer which is positioned at the side of the polymer electrolyte membrane 50. As illustrated in FIG. 6, the MEA 53 is interposed by the separators 1.

At the separator 1, an input through-hole 1*i* and an output through-hole 1*p* are formed as manifold through-holes extending in the thickness direction of the separator 1. Reactant gas (e.g., fuel gas or oxidant gas), which has not been electrochemically reacted, flows through the input through-hole 1*i*, while gas after reacted (e.g., fuel gas or oxidant gas), which has been electrochemically reacted, flows through the output through-hole 1*p*. In FIG. 6, a passage, which communicates the input through-hole 1*i* with the surface passages 22 at the side of one of the fuel electrode 51 and the air electrode 52, is not illustrated herein. Likewise, a passage, which communicates the output through-hole 1*p* with the surface passages 22 at the side of the other one thereof, is not illustrated herein. According to the polymer electrolyte fuel cell illustrated in FIG. 6, the fuel gas flows through the surface passages 22 at the one side of the separator 1, and the oxidant gas flows through the surface passages 22 at the other side of the separator 1. Accordingly, electrical energy is generated in response to electrochemical reaction.

As is obvious from FIG. 6, the plural projections 20 of the first sheet 2 is electrically in contact with the fuel electrode 51 or the air electrode 52. Therefore, current collecting performance of the electric energy generated can be assured appropriately. Especially as illustrated in FIG. 1, an area A of the separator 1, on which the surface passages 22 are formed, is a single layer structure, and interface resistance has disappeared between the first sheet 2 and the second sheets 3. Therefore, electric resistance of the area A is less than that of an area B of the separator 1, on which the surface passages 22 do not exist, therefore it is effective to assure current collecting performance at the area A. Further, at portions 22m having the bottom surfaces 23 forming the surface passages 22, a compression amount is relatively large, and the density of the portions 22m is increased.

The separator 1 is required to possess gas shielding which prevents the fuel gas or the oxidant gas from leaking out to the other electrode. Further, when a fuel cell is assembled to the separator 1, the separator 1 is compressed in a laminated direction, so that the separator 1 is required to excel in creep resistance against the compression. Still further, because generated electric energy is derived through the separator 1, the separator 1 is required to exhibit low electric resistance and high electric conductivity. As described above, the separator 1 according to the first embodiment comprehensively excels in gas shielding, creep resistance, and electric resistance. Still further, when the maximum thickness of the outer edge portion of the separator 1 is set at t1, the thickness of the respective projections 20 is set at t2, the thickness of the outer edge portion 25 of the first sheet 2 is set at t1', and the thickness of the portion 22m having the bottom surface 23 forming the surface passage 22 is set at t3, a dimensional relationship therebetween will be expressed at t1>t2>t1'>t3.

Second Embodiment

Figure 7A:
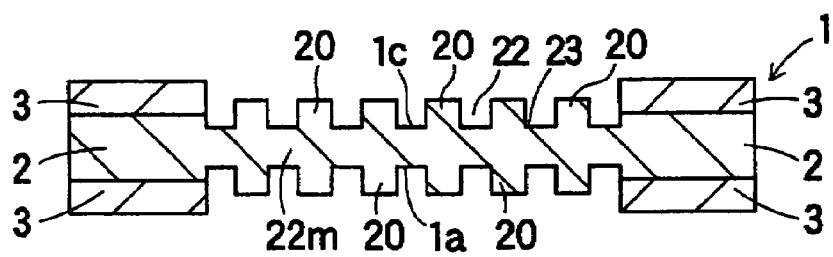
FIGS. 7A and 7B are cross sectional views illustrating a separator according to a second embodiment of the present invention.
Figure 7B:
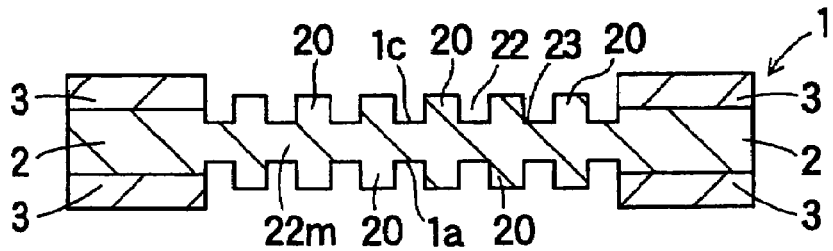

A second embodiment of the present invention is described with reference to FIGS. 7A and 7B. The separator 1 according to the second embodiment basically possesses the same structure, and the same effects, as the first embodiment, and the following description will be only differences therebetween. According to an example illustrated in FIG. 7A, a proportion or a content of binder per unit volume in the second sheet 3 is set to be lower than that of the first sheet 2. In this case, the second sheet 3 can be prevented from being adhered to an inner surface of the pressurizing die 4, upon a thermal press molding. According to another example illustrated in FIG. 7B, the proportion or the content of the binder per unit volume in the second sheet 3 is set to be higher than that of the first sheet 2. In this case, while electric conductivity of the first sheet 2 is enhanced in response to reduction in the proportion or content of the binder in the first sheet 2, a bonding performance of the first sheet 2 and the second sheets 3 are assured at an appropriate level. This proportion or content of the binder is effective to assure mechanical strength of the second sheet 3.

Third Embodiment

A third embodiment of the present invention is described with reference to FIGS. 8A and 8B. The separator 1 according to the third embodiment basically possesses the same structure, and the same effects, as the first embodiment. According to an example illustrated in FIG. 8A, the volume specific content of the binder in the second sheet 3 is fundamentally higher than that of the first sheet 2. In this case, while electric conductivity of the first sheet 2 is enhanced in response to reduction in the content of the binder in the first sheet 2, a bonding performance between the first sheet 2 and the second sheets 3 are assured at an appropriate level. Further, the second sheet 3 is rich in binder, so that it is effective to assure mechanical strength of the second sheets 3. Further, when the content of binder per unit volume of a surface 3s of each second sheet 3, which is at an opposite side to the first sheet 2, is compared with that of the binder of an inside 3i of each second sheet 3, the volume specific content of the binder of the surface 3s is set to be lower than that of the inside 3i. Alternatively, the content of the binder on the surface 3s of each second d sheet 3 can be set at zero in such a manner that the binder do not expose on the surface 3s. As described above, when the binder on the surface 3s of each second sheet 3 is less or none, it is possible to prevent the second sheets 3 from being adhered to an inner surface of the pressurizing die 4, upon a thermal press molding.

Figure 8A:
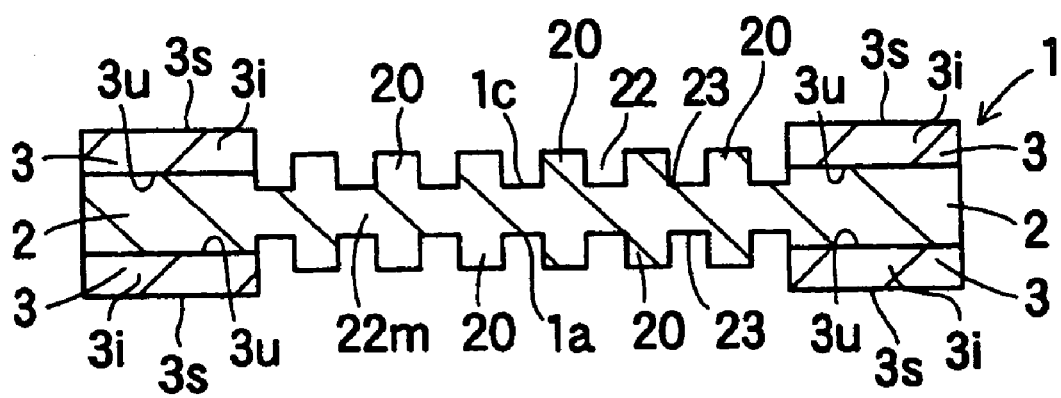
FIGS. 8A and 8B are cross sectional views illustrating a separator according to a third embodiment of the present invention.

Further, according to the example illustrated in FIG. 8A, when the content of the binder of a surface 3u of each second sheet 3, which faces the first sheet 2, is compared with that of the binder of the inside 3i of each second sheet 3, the content of the binder of the surface 3u of each second sheet 3 can be set greater than that of the inside 3i of each second sheet 3, or greater than that of the first sheet 2. In this case, it is possible to expose the binder on the surface 3u of each second sheet 3. Accordingly, a bonding performance between the first sheet 2 and each second sheet 3 can be enhanced. According to the example illustrated in FIG. 8B, the content of the expanded graphite material for the first sheet 2, which includes the projections 20 configured to electrically contact with the first electrode 51 and the air electrode 52, is set to be greater than the content of the expanded graphite material for each second sheet 3. As a result, the volume specific electric resistance of the first sheet 2 is set to be lower than that of each second sheet 3. In other words, electric conductivity of the first sheet 2 is set higher than that of the second sheet 3, therefore current collecting performance of the first sheet 2 can be enhanced than that of each second sheet 3.

Figure 8B:
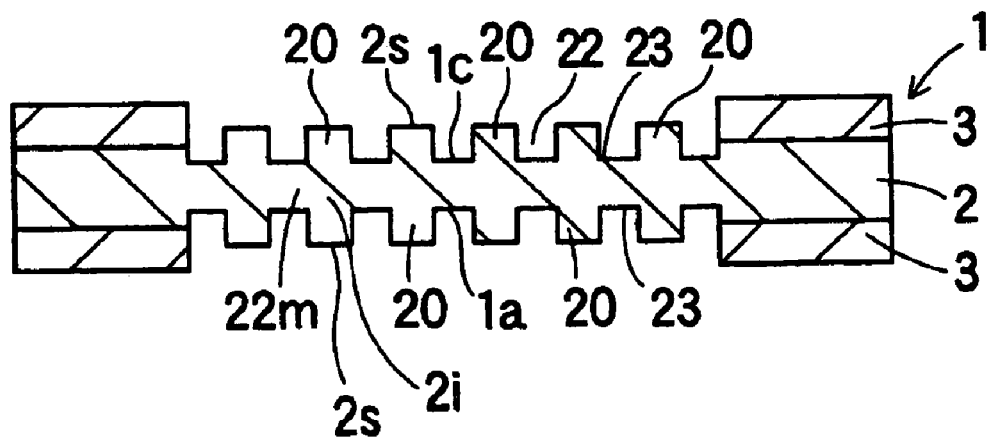

According to the example illustrated in FIG. 8B, the content of binder of a surface 2s of the first sheet 2 is set to be lower than that of an inside 2i of the first sheet 2. Here, the content of binder of the surface 2s can be zero. In this case, it is possible, at a thermal press molding, to prevent the first sheet 2 from being adhered to an inner surface of the pressurizing die 4, and also it is possible to assure electric conductivity of the surface 2s which is configured to come in contact with the fuel electrode 51 or the air electrode 52.

Fourth Embodiment

A fourth embodiment of the present invention is described with reference to FIG. 9. The separator 1 according to the fourth embodiments basically possesses the same structure, and the same effects, as the first embodiment. As is obvious from FIG. 9, the first sheet 2 is a laminated structure with plural laminated layers. More specifically, the first sheet 2 is produced with a first layer 2f, which functions as an internal layer of the first sheet 2, a second layer 2s, which functions as an external layer of the first sheet 2, and a third layer 2t, which functions as an external layer of the first sheet 2. The proportion of the binder of the first layer 2f is set to be greater than the proportions, of binder of the second layer 2s, and of binder of the third layer 2t. As a result, gas shielding, and mechanical strength, of the first sheet 2, especially of the first layer 2f, can be assured.

According to the fourth embodiment, as described above, because the proportion of binder of the first layer 2f is larger than that of the second layer 2s and than that of the third layer 2t, the amount of binder respectively contained in the second layer 2s and the third layer 2t is relatively less than the first layer 2f, so that the second layer 2s and the third layer 2t is expanded graphite material-rich. As described above, because the amount of resin respectively contained in the second layer 2s and the third layer 2t is relatively less than that contained in the first layer 2f, it is possible to prevent the second layer 2s and the third layer 2t from being adhered to an inner surface of the pressurizing die, at a thermal press molding. Further, because the proportion of expanded graphite of the second layer 2s and the proportion of the expanded graphite of the third layer 2t are larger than that of the first layer 2f, it is effective to enhance electric conductivity of the first sheet 2, and it is possible to assure, at an appropriate level, electric conductivity and current collecting performance of the first sheet 2 relative to the fuel electrode 51 and/or the air electrode 52.

Figure 9:
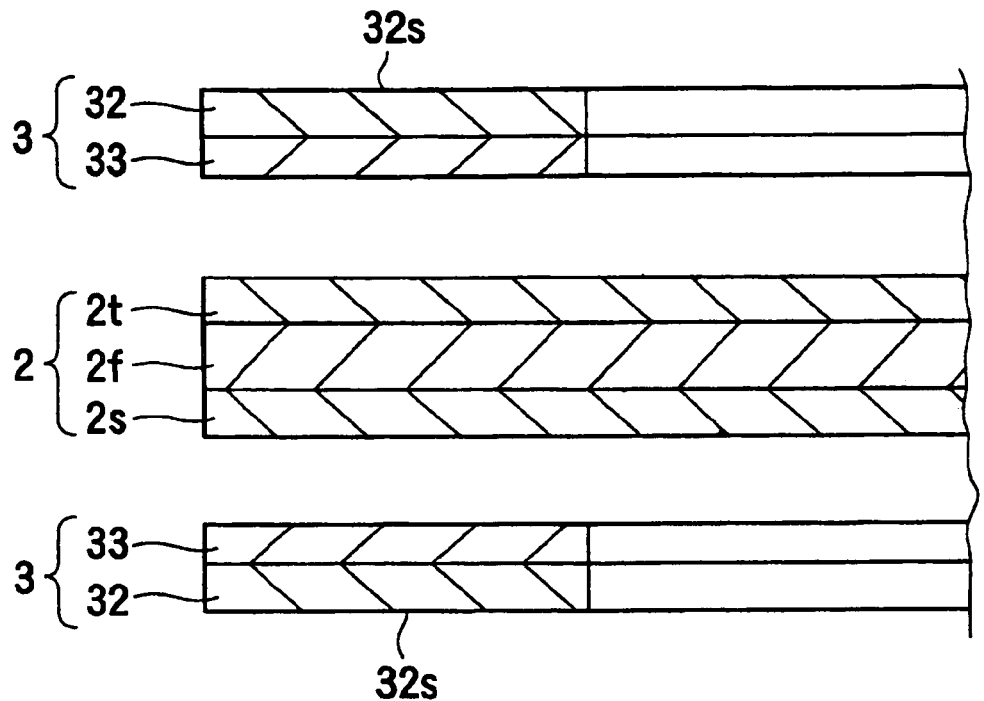
FIG. 9 is a cross sectional view illustrating a first sheet and second sheets, which have not been thermally press-molded, according to a fourth embodiment of the present invention.

As illustrated in FIG. 9, the second sheet 3 is a laminated structure with plural laminated layers, which are a front layer 32 and a back layer 33. The back layer 33 of each second sheet 3 is positioned at the side facing the first sheet 2, and the content of the binder of the back layer 33 is set higher than that of the front layer 32. As a result, the content of the binder is increased at a surface of the second sheet 3 facing the first sheet 2, and the bonding performance between the first sheet 2 and each second sheet 3 is assured. As illustrated in FIG. 9, the front layer 32 of each second sheet 3 is positioned at an opposite side to the first sheet 2, and the content of the expanded graphite material of the front layer 32 is relatively higher than the back layer 33. In other words, the front layer 32 is expanded graphite material-rich. Therefore, the front layer 32 of the second sheet 3 can be effectively prevented from being easily adhered to the inner surface of the pressurizing die 4. Otherwise, the content of the binder of a surface 32s for the front layer 32 can be zero. In this case, the front layer 32 can be furthermore prevented from being adhered to the inner surface of the pressurizing die 4.

Fifth Embodiment

Figure 10:
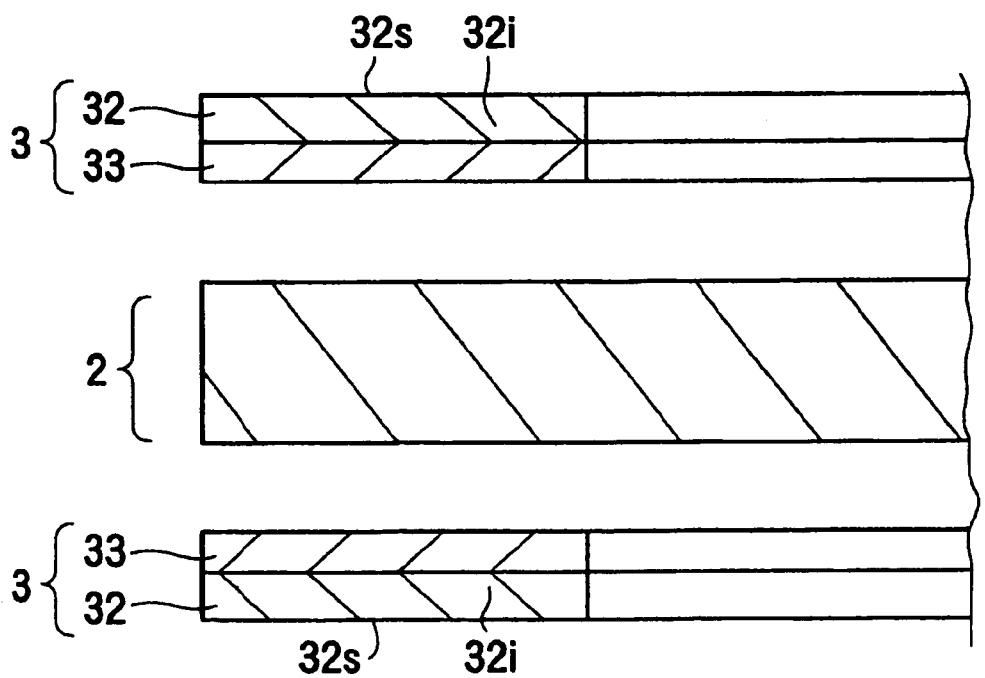
FIG. 10 is a cross sectional view illustrating a first sheet and second sheets, which have not been thermally press-molded, according to a fifth embodiment of the present invention.

A fifth embodiment of the present invention is described with reference to FIG. 10. The separator 1 according to the fifth embodiment basically possesses the same structure, and the same effects, as the first embodiment. As illustrated in FIG. 10, the first sheet 2 can be a single layered structure as well as the first embodiment. Each second sheet 3 is a laminated structure with plural laminated layers, which are the front layer 32 and the back layer 33. As we can see from FIG. 10, the back layer 33 of the second sheet 3 is positioned at the side facing the first sheet 2, and the content of the binder of the back layer 33 is set higher than that of the front layer 32. As a result, the content of the binder for the back layer 33 of the second sheet 3 is increase, thereby assuring a bonding performance between the first sheet 2 and the second sheets 3. Further, the front layer 32 of the second sheet 3 is positioned at an opposite side to the first sheet 2, and the amount of binder contained in the front layer 32 is less than that contained in the back layer 33, so that the front layer 32 is expanded graphite material-rich. Therefore, at a thermal press molding, the front layer 32 of the second sheet 3 can be effectively prevented from being easily adhered to the inner surface of the pressurizing die 4. Moreover, while an inside 32i of the front layer 32 contains, therein, the binder, it is possible to control the content of the binder of the surface 32s at zero. In this case, the front layer 32 is furthermore prevented form being easily adhered to the inner surface of the pressurizing die 4.

Sixth Embodiment

Figure 11:
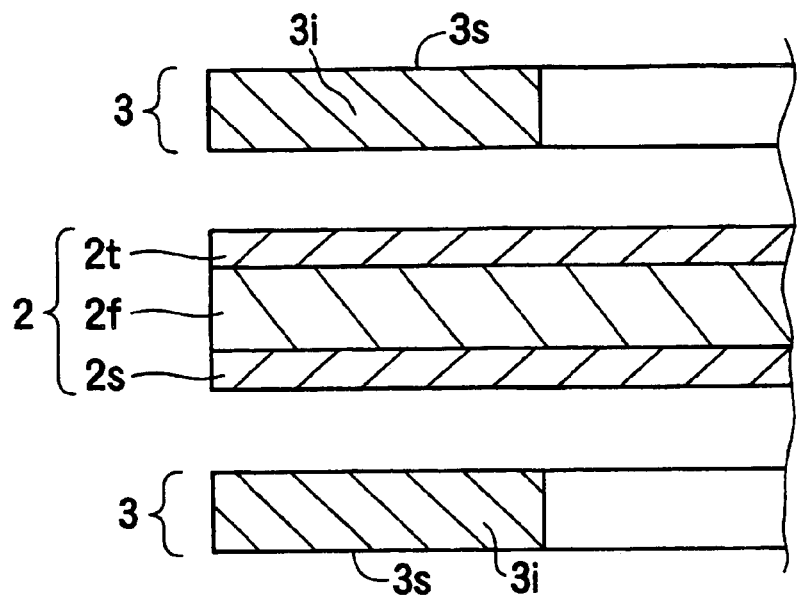
FIG. 11 is a cross sectional view illustrating a first sheet and second sheets, which have not been thermally press-molded, according to a sixth embodiment of the present invention.

A sixth embodiment of the present invention is described with reference to FIG. 11. The separator 1 according to the sixth embodiment basically possesses the same structure, and the same effects, as the first embodiment. As is illustrated in FIG. 11, the first sheet 2 is a laminated structure with plural laminated layers which are the first layer 2f, which acts as the internal layer, the second layer 2s, which acts as the external layer, and the third layer 2t, which acts as the external layer. The content of the binder of the first layer 2f is set higher than the contents, of the binder of the second layer 2s, and of the binder of the third layer 2t. Therefore, the proportion of binder of the first layer 2f is larger than that of the second layer 2s and that of the third layer 2t, therefore enhancing gas shielding and mechanical strength of the separator 1. The binder is actually made of resin.

In other words, the amount of the binder, which are respectively contained in the second layer 2s and the third layer 2t, is less than that contained in the first layer 2f, so that the second layer 2s and the third layer 2t are expanded graphite material-rich. As described above, because the amount of resin, which is contained in the second layer 2s and the third layer 2t, is less than that of the first layer 2f, it is possible to restrain the second layer 2s and the third layer 2t from being adhered to the inner surface of the pressurizing die 4, at a thermal press molding. Further, because the proportion of the expanded graphite of the second layer 2s and the proportion of the expanded graphite of the third layer 2t is larger than that of the first layer 2f, electric conductivity, and current collecting property, of the first sheet 2 can be effectively enhanced. Still as is illustrated in FIG. 11, the second sheet 3 is a single layer structure. While the inside 3i of the second sheet 3 includes the binder, the content of the binder of the surface 3s, which is positioned at the opposite side to the first sheet 2, can be controlled at zero. In this case, the second sheet 3 can be furthermore prevented from being easily adhered to the inner surface of the pressurizing die 4.

Seventh Embodiment

Figure 12:
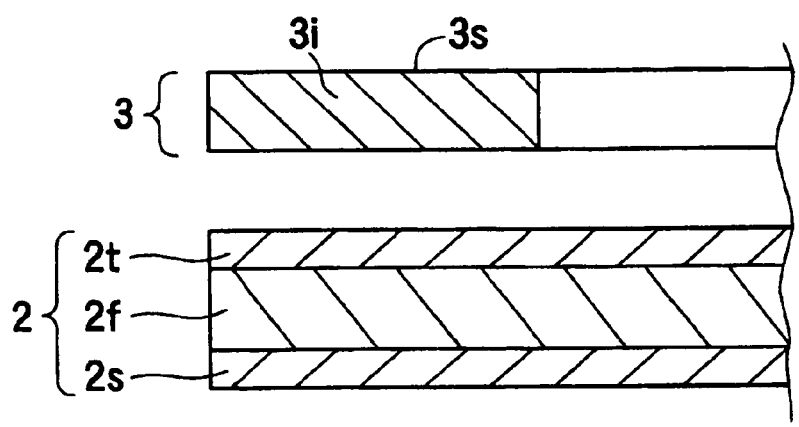
FIG. 12 is a cross sectional view illustrating a first sheet and second sheets, which have not been thermally press-molded, according to a seventh embodiment of the present invention.

A seventh embodiment of the present invention is described with reference to FIG. 12. The separator 1 according to the seventh embodiment basically possesses the same structure, and the same effects, as the first embodiment. As illustrated in FIG. 12, the first sheet 2 is a laminated structure with plural layers, which are the first layer 2f, which acts as the internal layer, the second layer 2s, which acts as the external layer, and the third layer 2t, which acts as the external layer. As is obvious from FIG. 12, the second sheet 3 is a single layer structure. Although the second sheet 3 is bonded to one surface of the first sheet 2, the second sheet 3 is not bonded to the other surface of the first sheet 2. While the inside 3i of the second sheet 3 contains the binder, it is possible to control the content of the binder for the surface 3s for the second sheet 3 at zero. In this case, it is possible to prevent the second sheet 3 from being easily adhered to the inner surface of the pressurizing die 4.

Eighth Embodiment

Figure 13:
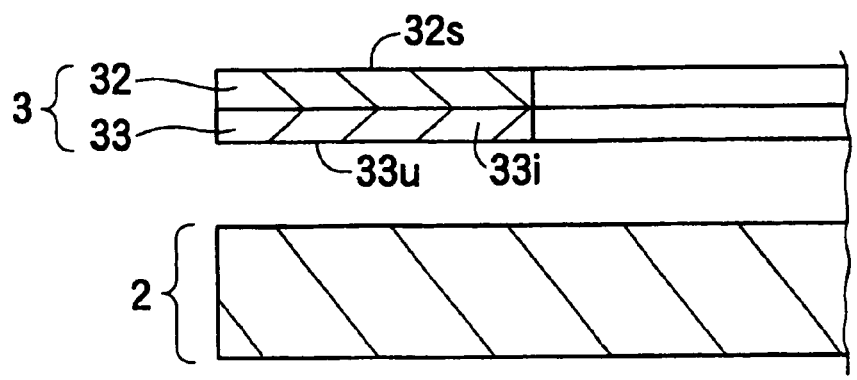
FIG. 13 is a cross sectional view illustrating a first sheet and second sheets, which have not been thermally press-molded, according to an eighth embodiment of the present invention.

An eighth embodiment of the present invention is described with reference to FIG. 13. The separator 1 according to the eighth embodiment basically possesses the same structure, and the same effects, as the fifth embodiment. As illustrated in FIG. 13, the first sheet 2 is a single layer strucspecimens is set at 2.6 mm. Table 1 summarizes the molding conditions of test specimens and the characteristics of the compressed test specimens.

TABLE 1

Test of Model Test Specimens

| | First Sheet | | | | Second Sheet | | | | |
|---|---|---|---|---|---|---|---|---|---|
| | Binder | Expanded Graphite Material:Binder % by weight | Basic Weight kg/m3 | Thickness mm | Binder | Expanded Graphite Material:Binder % by weight | Basic Weight kg/m3 | Thickness mm | Molding Condition Surface Pressure tonf/cm2 |
| Test Example 1 | PPS | 80:20 | 2.08 | 2.0 | PPS | 80:20 | 0.67 | 0.7 | 1.50 |
| Test Example 2 | PPS | 60:40 | 2.42 | 2.0 | PPS | 60:40 | 0.87 | 0.7 | 2.00 |
| Test Example 3 | PPS | 58:42 | 2.64 | 2.0 | PPS | 58:42 | 0.89 | 0.7 | 2.25 |
| Comparative Example 1 | PPS | 80:20 | 2.08 | 3.5 | — | — | — | — | 0.75 |
| Comparative Example 2 | PPS | 60:40 | 2.42 | 3.5 | — | — | — | — | 1.00 |

| | Molding Condition | | | | After Molding | | |
|---|---|---|---|---|---|---|---|
| | Preheating Temp. °C. | Molding Temp. °C. | Thickness mm | Density g/cm3 | Hydrogen Permeability Coefficient kmol · m/ (sec · m2 · kPa) | Thickness Change Ratio % | Electric Resistance mΩ · cm2 |
| Test Example 1 | 300 | 250 | 2.56 | 1.50 | ≦1.38 × 10−17 | 0.9 | 13.6 |
| Test Example 2 | 300 | 250 | 2.58 | 1.63 | ≦1.39 × 10−17 | 0.4 | 19.4 |
| Test Example 3 | 300 | 250 | 2.58 | 1.65 | ≦1.39 × 10−17 | 0.4 | 20.8 |
| Comparative Example 1 | 300 | 250 | 2.54 | 0.94 | 1.36 × 10−12 | 4.2 | 19.5 |
| Comparative Example 2 | 300 | 250 | 2.53 | 1.38 | ≦1.36 × 10−17 | 2.5 | 18.8 | ture. The second sheet 3 is a laminated structure with plural layers, which are the front layer 32 and the back layer 33. The back layer 33 of the second sheet 3 is positioned at the side facing the first sheet 2, and the content of the binder of the back layer 33 is set higher than that of the front layer 32. Especially, a surface 33u, which is provided at the back layer 33 and faces the first sheet 2, is resin-rich more than an inside 33i of the back layer 33 and the front layer 32. As a result, a bonding performance of the first sheet 2 and the second sheet 3 can be assured.

The front layer 32 of the second sheet 3 is positioned at the opposite side to the first sheet 2, and the content of the binder contained in the front layer 32 is low. Therefore, the front layer 32 is expanded graphite material-rich. As is obvious from FIG. 13, the first sheet 2 is a single layer. Although the second sheet 3 is bonded to one surface of the first sheet 2, the second sheet 3 is not bonded to the other surface of the first sheet 2. It is possible to control the content of the binder of a surface 32s of the front layer 32 of the second sheet 3 at zero. In this case, the second sheet 3 can be prevented from being easily adhered to the inner surface of the pressurizing die 4.

Experimental results, as for examples 1, 2 and 3, and comparative examples, are described below. The experiments were implemented by use of a model test specimens of flat shape. In this case, a target thickness of compressed test

TEST EXAMPLE 1

Test Example 1 corresponds to the first embodiment of the present invention, but without grooves. At the first place, a mixture is prepared, which includes expanded graphite particles (produced by TOYO TANSO CO., LTD.) and Polyphenylene Sulfide(PPS). In this case, as is summarized in Table 1, the weight ratio of the expanded graphite particles and Polyphenylene Sulfide is 80:20. The mixture is rolled with pressure by a multi-stage roller and is molded to the first sheet 2, which exhibits thickness: 2.0 mm and basis weight: 2.08 kg/m². The basis weight represents a weight of a sheet per square meter. The second sheet 3 was formed in the same manner as the first sheet 2. The second sheet 3 exhibits thickness: 0.7 mm and basis weight: 0.67 kg/m².

Figure 14:
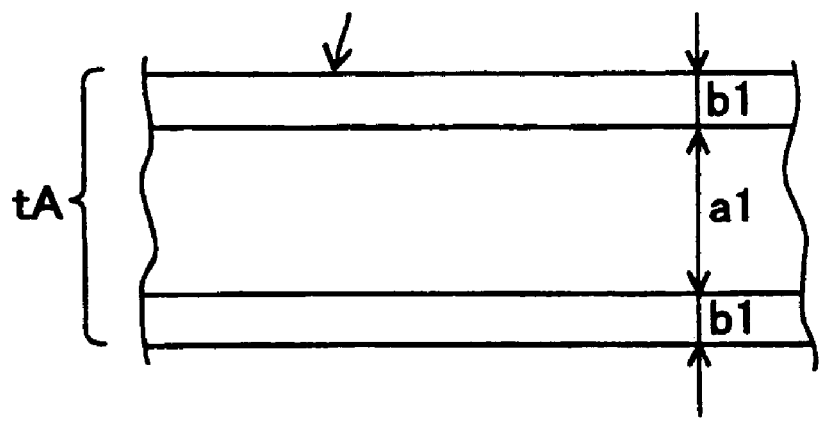
FIG. 14 is a cross sectional view illustrating a first sheet, which has not been thermally press-molded, according to Test Example 1.

As illustrated in FIG. 14, as for the first sheet 2, Polyphenylene Sulfide(PPS), which is employed as the binder, was allocated to an internal layer portion a1, and yet it was not allocated in external layer portions b1. The thickness of the internal layer portion a1 occupied 70% of the entire thickness tA, while the thickness of each external layer portion b1 occupied 15% thereof.

Figure 15:
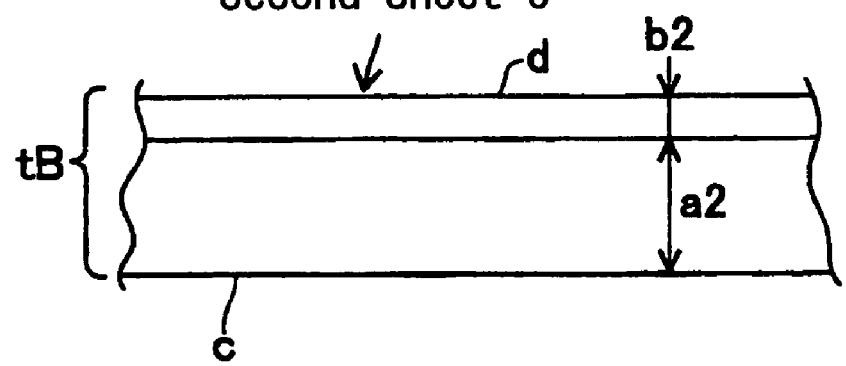
FIG. 15 is a cross sectional view illustrating a second sheet, which has not been thermally press-molded, according to Test Example 1.

As illustrated in FIG. 15, as for the second sheet 3, Polyphenylene Sulfide (PPS) was allocated to a layer portion a2, and yet it was not allocated in the other layer b2. The thickness of the layer portion a2 occupied 90% of the entire thickness tB, while the thickness of the other layer portion b2 occupied 10% thereof. A surface, which is denoted with a reference sign c in FIG. 15, is a surface of the second sheet 3 facing the first sheet 2, and a surface, which is denoted with a reference sign d in FIG. 15, is a surface of the second sheet 3 positioned at an opposite side to the first sheet 2.

Next, the first sheet 2 and the second sheet 3 were preheated by a heating plate for 10 seconds to 300° C. The first sheet 2 and the second sheet 3 were then arranged in a laminated state on a flat-board type pressurizing die which had been preset at a pressing machine, so that the laminated product 15 was produced. The laminated product 15 was thermally press molded by the flat-board type pressurizing die which has been attained at a surface pressure of 1.5 tonf/cm$^2$ and a die temperature of 250° C. which corresponds to a molding temperature 250° C., so that a molded product was manufactured. Here, press loading to the laminated product 15 was not maintained, and the molded product was taken out of the pressurizing die along with press molding. After that, the molded product was interposed in a jig for modifying its warp and cooled down to a room temperature, so that a flat-shaped molded product of the laminated structure was manufactured.

TEST EXAMPLE 2

Test Example 2 corresponds to the first embodiment of the present invention, but without grooves. Test Example 2 was implemented fundamentally in the same manner as Test Example 1, and the following explanation will be focused on only differences therebetween. Likewise as Test Example 1, a mixture is prepared, which includes expanded graphite material particles and Polyphenylene Sulfide (PPS). In this case, as is summarized in Table 1, the weight ratio of the expanded graphite material particles and Polyphenylene Sulfide (PPS) is 60:40. Compared with the first embodiment, the ratio of Polyphenylene Sulfide is greater. The mixture is rolled with pressure by the multi-stage roller and is molded to the first sheet 2 (see FIG. 14), which exhibits basis weight: 2.42 kg/m$^2$, which is greater than that of Test Example 1. The second sheet 3 was formed in the same manner as the first sheet 2. The second sheet 3 exhibits basis weight: 0.87 kg/m$^2$, which is greater than that of Test Example 1. After preheating the first sheet 2 and the second sheet 3, they were then arranged in a laminated state on the flat-board type-pressurizing die, which had been preset at the pressing machine, and thermally press molded at a surface pressure of 2.0 tonf/cm$^2$, which is greater than that of Test Example 1. As a result, a molded product, which is of flat shaped laminated structure and exhibits a board thickness t1 of 2.58 mm, was manufactured.

TEST EXAMPLE 3

Test Example 3 was implemented fundamentally in the same manner as Test Example 1. As for the first sheet 2, a mixture was prepared, which includes the expanded graphite material particles and Polyphenylene Sulfide at the weight ratio of 58:42. The first sheet 2 exhibited basis weight: 2.64 kg/m$^2$. The second sheet 3 was manufactured in the same manner. As for the second sheet 3, a mixture was prepared, which includes the expanded graphite material particles and Polyphenylene Sulfide at the weight ratio of 58:42. The second sheet 3 exhibited basis weight: 0.89 kg/m$^2$. Polyphenylene Sulfide (PPS), which is binder for the first sheet 2 and the second sheet 3, were allocated in the same manner as Test Example 2 (see FIGS. 14 and 15). After preheating the first sheet 2 and the second sheet 3, they were then thermally press molded in the same manner as Test Example 1, and a molded product, at board thickness: 2.58 mm, was manufactured. Here, a surface pressure of the pressurizing die 4 was set at 2.25 tonf/cm$^2$.

COMPARATIVE EXAMPLE 1

Comparative Example 1 was implemented fundamentally in the same manner as the Test Example 1. The following description will focus on only differences therebetween. The first sheet 2, which has not been pressurized yet, exhibited board thickness: 3.5 mm. After preheating the first sheet 2, the first sheet 2 was arranged in a laminated structure on the flat-board type pressurizing die which had been set at the pressing machine, and was molded at a surface pressure: 0.75 tonf/cm$^2$, which is lower than those of Test Examples 1 and 2. The first sheet 2 then exhibited board thickness: 2.54 mm. Here, the second sheet 3 was not laminated.

COMPARATIVE EXAMPLE 2

Comparative Example 2 was implemented fundamentally in the same manner as Test Example 1. The following description will focus on only differences therebetween. As for the first sheet 2, a mixture was prepared, which includes the expanded graphite material particles and Polyphenylene Sulfide at the weight ratio of 60:40. The first sheet 2 exhibited basis weight: 2.42 kg/m$^2$, which is greater than that of Test Example 1. After preheating the first sheet 2, the first sheet 2 was arranged in a laminated structured on the flat-board type pressurizing die, which had been set at the pressing machine, and was thermally press molded at a surface pressure 1.0 tonf/cm$^2$. The first sheet 2 then exhibited board thickness: 2.53 mm. Here, the second sheet 3 was not laminated.

EVALUATION

Figure 16:
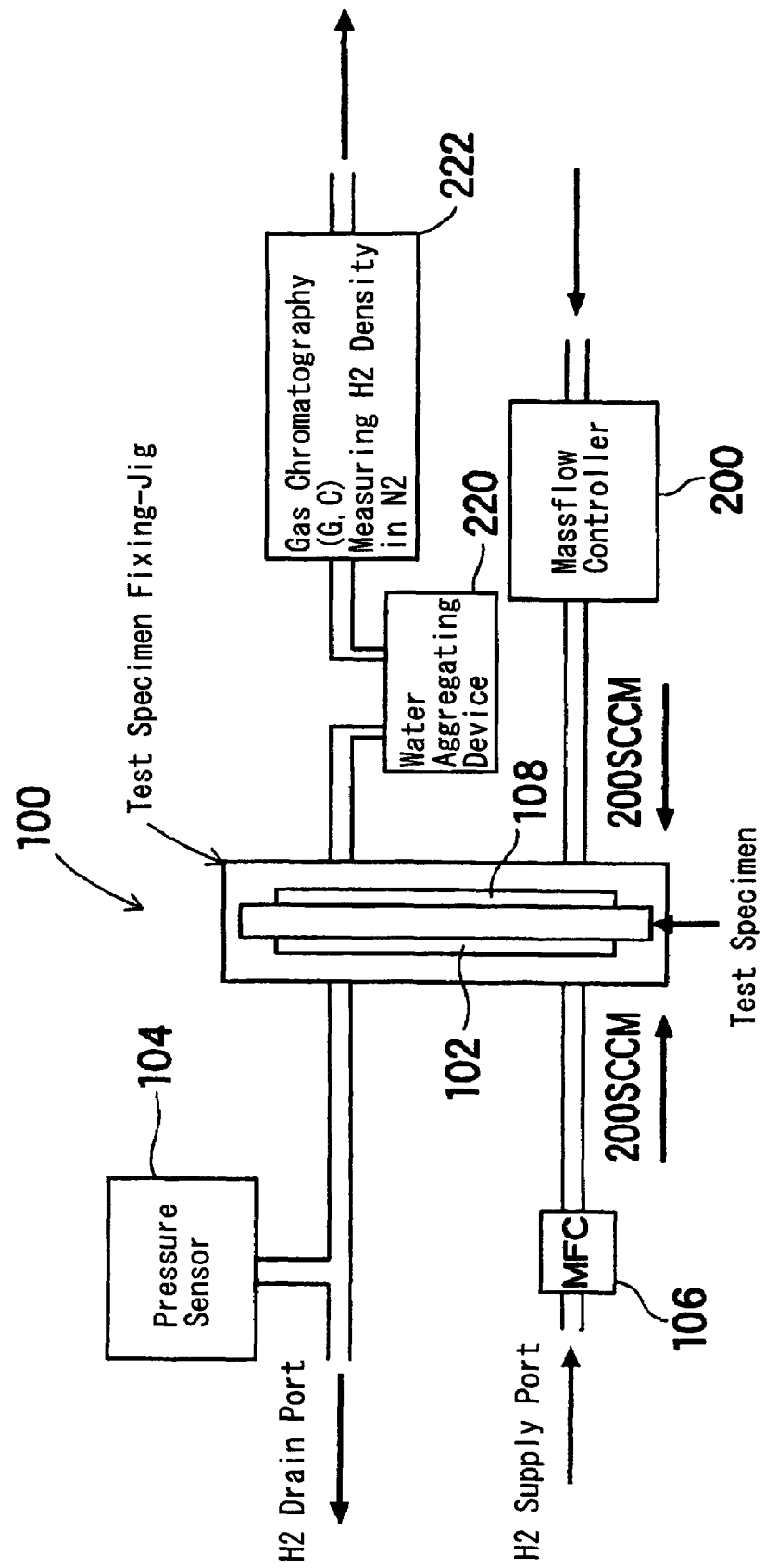
FIG. 16 is a block view illustrating a measuring device which measures a gas permeability coefficient.

The above described test examples and comparative examples were evaluated. A test specimen (55 mm×55 mm) was cut out from a flat-shaped molded product, and gas permeability coefficient, thickness change ratio (compression creep test) and electric resistance were measured. In order to evaluate gas permeability coefficient of hydrogen gas, as illustrated in FIG. 16, a test specimen was fixed into a test specimen-fixing jig 101 of a gas permeability device 100. The test specimen-fixing jig 101 is provided with a measuring surface: 13.85 cm$^2$. The test specimen-fixing jig 101 includes chambers 102 and 108 which are respectively arranged at both surface of the test specimen. As for the chamber 102 at the one surface of the test specimen, hydrogen gas is supplied, thereto, via a massflow controller (MFC) 106. A pressure sensor 104, which is equipped at an outlet side of the chamber 102, detects the pressure of the chamber 102. The chamber 102 was set at a pressure: 0.02 MPa.

As for the chamber 108 at the opposite surface of the test specimen, nitrogen gas was supplied, thereto, via a massflow controller 200. At the outlet side of the chamber 108, a water aggregating device 220 and a gas chromatograph detector 222 were arranged in this order. In a state where the outlet side of the chamber 108 communicates with an air, a flow volume of the nitrogen gas supplied to the chamber 108 was adjusted to 200 SCCM by the massflow controller 200. In this circumstance, the gas chromatograph detector 222 measures a density of hydrogen, which is contained in the nitrogen gas flowing in the chamber 108, and measures a gas permeability coefficient in the thickness direction of the test specimen. It is preferable that the gas permeability coefficient is low.

As for a thickness change ratio of a test specimen, the test specimen is fixed into the test specimen fixing-jig of a compression creep test machine, and is maintained being loaded with 5 MPa. After a lapse 100 hours, the thickness change amount Δt (Δt=thickness before test (tf)−thickness after test (ts)) was measured. On the basis of this thickness change amount, a thickness change ratio (Δt/tf×100%) of the test specimen was obtained. A thickness change ratio represents creep resistance and is preferably low.

As for electric resistance of a test specimen, the test specimen was provided, at front and back surfaces thereof, with electrode terminals (30 mm×30.6 mm, area: 10.8 cm$^2$) via carbon papers (manufactured by Toray Industries, Inc., TGH-H-60), and was loaded with 1 Mpa, in such a manner that the test specimen comes in contact with the carbon papers. In such circumstances, the electrode terminals were supplied with the measuring electric current of 3 A, and a voltage between the electrode terminals was measured. Electric resistance of the test specimen was obtained by a product of a value, which is calculated by dividing the voltage value by the measuring electric current, and an area of the electrode terminals. It is preferable that electric resistance is low. As we can see from Table 1, as for hydrogen permeability coefficient, Test Examples 1, 2 and 3 showed values not greater than a target value: $1\times10^{-16}$ kmol·m/(sec·m2·kPa), which were favorable, however, Comparative Example did not show a favorable value.

As for thickness change ratio, Test Examples 1, 2 and 3 showed values not greater than a target value: 1%, and could assure a target thickness value of the product which has been pressurized. However, Comparative Examples 1 and 2 showed values which greatly exceeds the target value: 1%, which were not favorable. As for a density after a thermal press molding, a value not less than 1.5 g/cm$^3$ is preferable. As for electric resistance, Test Examples 1, 2 and 3 and Comparative Examples 1 and 2 showed values not greater than 25 mΩ·cm$^2$, which were favorable. As a comprehensive evaluation, Test Examples 1, 2 and 3, which correspond to embodiments of the present invention, were favorable.

Moreover, Test Examples 4, 5 and Comparative Example 3 were implemented by actually manufacturing a fuel cell separator. Here, a target thickness (t1) of a separator after being pressurized was set at 2.6 mm. Table 2 summarizes molding conditions and characteristics of the separator after being molded. Test Example 4 was implemented fundamentally in the same manner as Test Example 1. As we can see from Table 2, a material was prepared, which included the expanded graphite material particles and Polyphenylene Sulfide (PPS) at the weight ratio of 80:20. The mixture was rolled by the multi-stage roller and was molded to the first sheet 2. The first sheet 2 exhibited thickness: 2.5, mm; basis weight: 2.08 kg/m$^2$; and 10% by volume. The second sheet 3 was formed in the same manner as the first sheet 2. The second sheet exhibited thickness: 0.7 mm; and basis weight 0.67 kg/m$^2$.

Next, the first sheet 2 and the second sheet 3 were preheated, by a heating plate, outside the pressurizing die 4 to 300° C. The first sheet 2 and the second sheet 3 were then arranged in a laminated structure on the pressurizing die 4, which had been set at the pressing machine, to be the laminated product 15. The laminated product 15 were thermally press molded by the pressurizing die 4 which had been attained at a surface pressure 1.5 tonf/cm$^2$ and at a die temperature 250° C. which corresponds to a molding temperature 250° C., and a molded product was formed. In this case, press loading to the molded product was not maintained, and the molded product was taken out of the pressurizing die along with press molding. After that, the molded product was interposed in a jig for modifying its warp and cooled down to a room temperature, so that the separator 1 for the fuel cell of the laminated structure was manufactured, which exhibits board thickness t1: 2.56 mm; board thickness t2: 2.16 mm; H2: 0.45 mm; and mean density: 1.50 g/cm$^3$. The mean density is obtained by dividing a molded product weight by a molded product volume that is obtained on the basis of board thickness of each portion.

Test Example 5 is fundamentally the same as Test Example 1. In this case, as summarized in Table 2, a mixture is prepared, which includes the expanded graphite material particles and Polyphenylene Sulfide (PPS) at the weight ratio of 60:40. That is, the content of Polyphenylene Sulfide is greater than that of Test Example 4. The mixture was rolled with pressure by a multi-stage roller and was molded to the first sheet 2, which exhibits thickness: 2.5 mm, which is the same as that of Test Example 4, and basis weight: 2.42 kg/m$^2$, which is greater than that of Test Example 4. The second sheet 3 was manufactured in the same manner as the first sheet 2. The second sheet 3 exhibited thickness: 0.7 mm, which is the same as that of Test Example 4, and basis weight: 0.87 kg/m$^2$, which is greater than that of Test Example 4.

Next, the first sheet 2 and the second sheet 3 were preheated by a heating plate for 10 seconds to 300° C., outside the pressurizing die 4. The first sheet 2 and the second sheet 3 were then arranged in a laminated state so as to become a laminated product 15. The laminated product 15 was thermally press molded by the pressurizing die 4 at a surface pressure of 2.0 tonf/cm$^2$ which is greater than that of Test Example 4, so that the separator 1 was manufactured. As described above, the separator 1 for the fuel cell of laminated structure was manufactured, which exhibited thickness t1: 2.58 mm; t2: 2.18 mm; H2: 0.45 mm; and density: 1.63 g/cm$^3$.

Comparative Example 3 was implemented fundamentally in the same manner as Test Example 5. In this case, the second sheet 3 was not laminated. Here, as summarized in Table 2, a mixture is prepared, which includes the expanded graphite material particles and Polyphenylene Sulfide (PPS) at the weight ratio of 60:40. The mixture was rolled with pressure by a multi-stage roller and was molded to the first sheet 2, which exhibited thickness: 3.5 mm; and basis weight: 2.42 kg/m$^2$. The first sheet 2 was preheated by a heating plate for 10 seconds to 300° C. The first sheet 2 was then arranged in a laminated state on the pressurizing die 4, and was thermally press molded by the pressurizing die 4 at a surface pressure of 1.5 tonf/cm$^2$, so that the separator 1 was manufactured. As described above, the separator 1 for the fuel cell of a single layer structure was manufactured, which exhibited thickness t1: 2.55 mm; t2: 2.17 mm; H2: 0.45 mm; and density: 1.48 g/cm$^3$.

Figure 17:
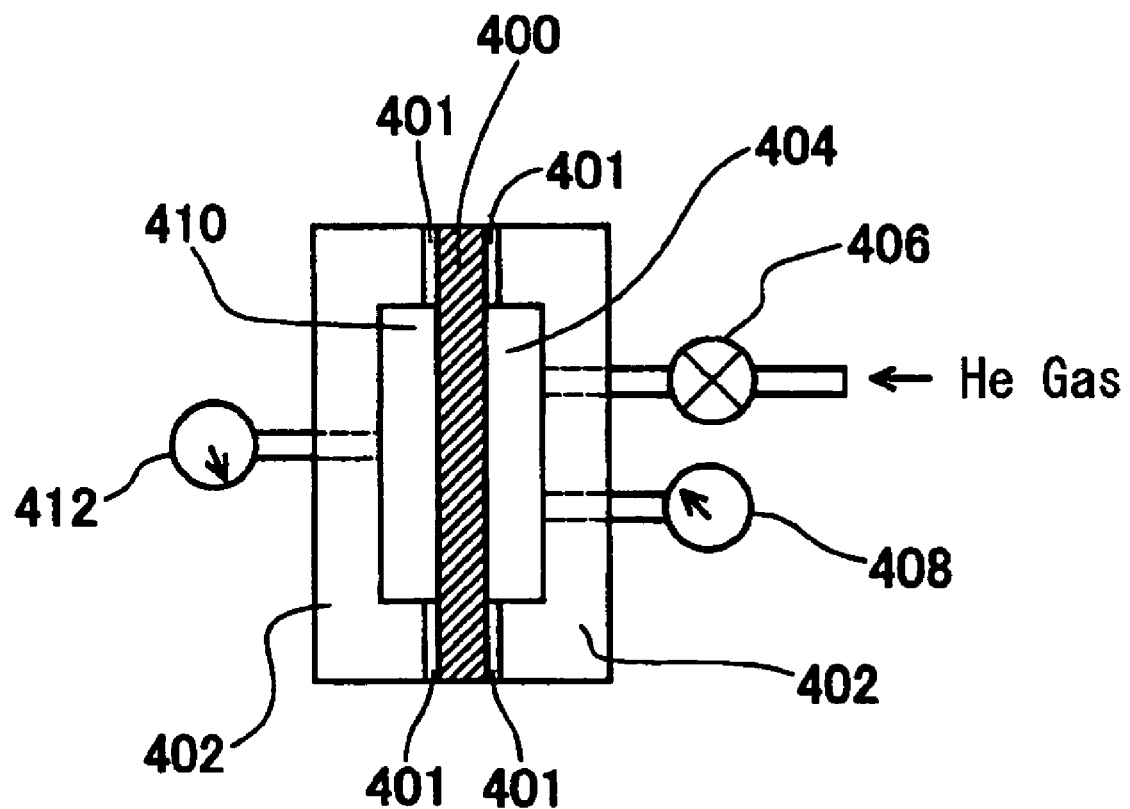
FIG. 17 is a block view illustrating a measuring device which measures a pressure change due to gas permeability.
Figure 18:
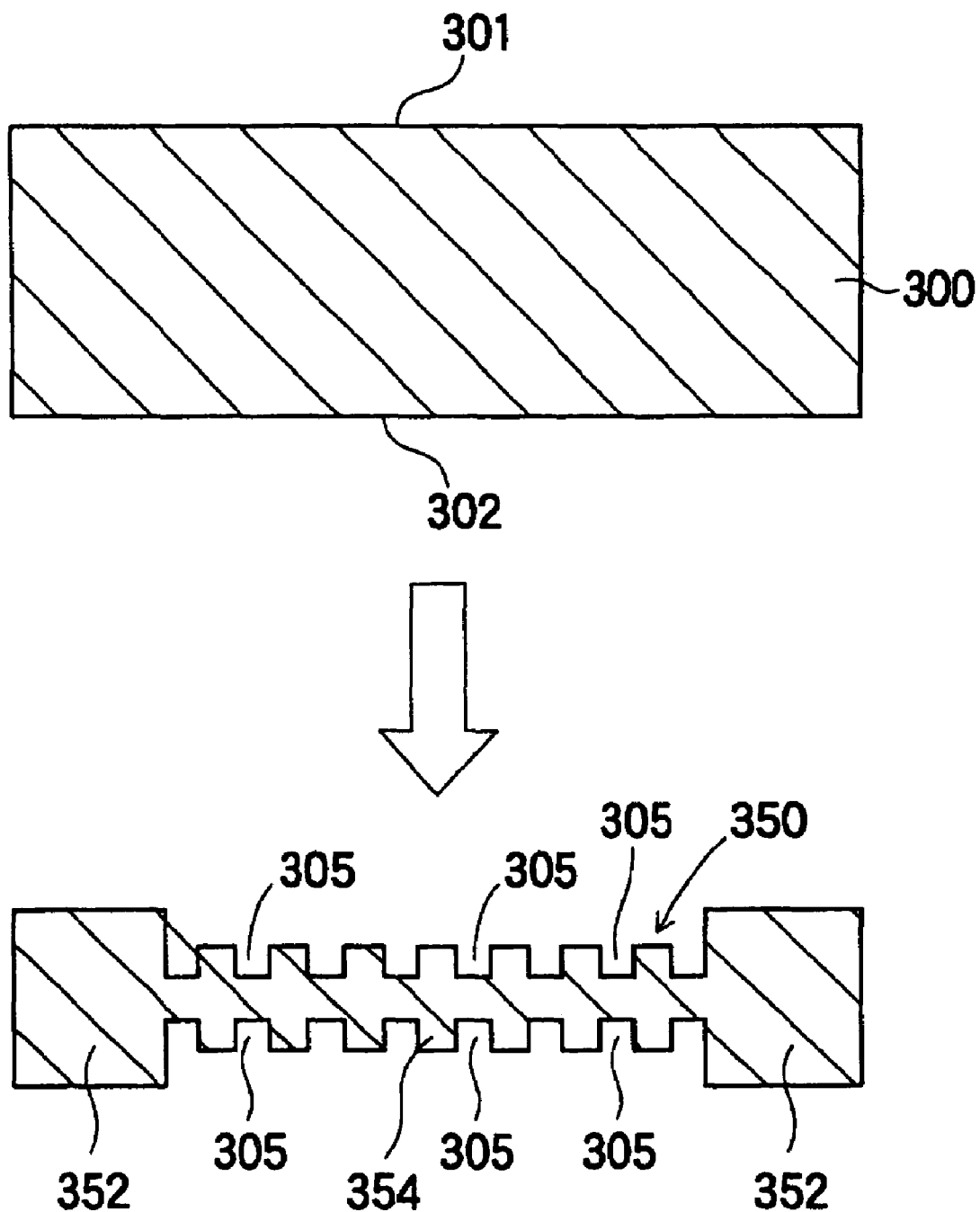
FIG. 18 is a cross sectional view schematically illustrating a state in which a separator is molded by thermally press-molding a laminated product with a first sheet and a second sheet according to a prior art.

According to the gas sealing test, as we can see from Table 2, Test Examples 4 and 5 showed good results, however Comparative Example 3 did not show a good result. Here, gas sealing test will be explained. As illustrated in FIG. 17, front and bask surfaces of a separator 400 is interposed in a fixing-jig 402 via seals 401. Helium gas was introduced, up to 20 kPa, to a gas chamber 404 at one side of the separator 400, and a valve 406 was closed. A pressure gauge 408 measured a decrease in a pressure of the gas chamber 404 in 5 minutes, and a pressure gauge 412 measured an increase in a pressure of a gas chamber 410. Here, ΔP1 represents a decrease in a pressure of the gas chamber 404, which was introduced with helium gas, in 5 minutes, while ΔP2 represents an increase in a pressure of the gas chamber 410 in 5 minutes.

As for thickness change ratio (a change ratio of a portion of the sealing surface 30), Test Examples 4 and 5 showed values which are not greater than 1% of a target value, which were favorable, so that a target thickness value after being pressurized could be assured. However, Comparative Example 3 showed a value which remarkably exceeds 1% of the target value, which was not favorable. As for electric resistance, Test Examples 4 and 5 showed values which were not greater than 25 mΩ·cm², which were favorable. As a comprehensive evaluation, Test Examples 4 and 5, which correspond to the embodiments of the present invention, were favorable.

TABLE 2

Test of Fuel Cell Separator

| | First Sheet | | | | Second Sheet | | | | Molding Condition |
| --- | --- | --- | --- | --- | --- | --- | --- | --- | --- |
| | Binder | Expanded Graphite Material:Binder % by weight | Basic Weight kg/m3 | Thickness mm | Binder | Expanded Graphite Material:Binder % by weight | Basic Weight kg/m3 | Thickness mm | Surface Pressure tonf/cm2 |
| Test Example 4 | PPS | 80:20 | 2.08 | 2.5 | PPS | 80:20 | 0.67 | 0.7 | 1.50 |
| Test Example 5 | PPS | 60:40 | 2.42 | 2.5 | PPS | 60:40 | 0.87 | 0.7 | 2.00 |
| Comparative Example 3 | PPS | 60:40 | 2.42 | 3.5 | — | — | — | — | 1.50 |

| | Molding Condition | | After Molding | | | | | | |
| --- | --- | --- | --- | --- | --- | --- | --- | --- | --- |
| | Preheating Temp. | Molding Temp. | Thickness mm | | | Density | Gas Sealing Test | Thickness Change Ratio | Electric Resistance |
| | °C. | °C. | t1 | t2 | t3 | g/cm3 | kPa | % | mΩ·cm2 |
| Test Example 4 | 300 | 250 | 2.56 | 2.16 | 0.45 | 1.50 | Δ P1: 0.43<br>Δ P2: 0.0 | 0.9 | 14.0 |
| Test Example 5 | 300 | 250 | 2.58 | 2.18 | 0.45 | 1.63 | Δ P1: 0.41<br>Δ P2: 0.0 | 0.4 | 19.7 |
| Comparative Example 3 | 300 | 250 | 2.55 | 2.17 | — | 1.48 | Δ P1: 9.0<br>Δ P2: 9.0 | 2.4 | 15.0 |

OTHER EXAMPLE

According to the first embodiment of the present invention, the separator 1 is a two-layer structure laminated with the first sheet 2 and the second sheet 3. However, the structure of the separator 1 is not limited to the above, and can be a three-layer structure laminated with the first sheet 2, the second sheet 3 and a third sheet. Moreover, the separator 1 can be a plural-layer structure which is greater than two and three.

In general, a fuel cell is built with a separator which is formed with plural layers laminated in a first (thickness) direction, so that an outer edge portion of the separator is required to possess a required board thickness. When a compression amount is increased, and the separator is densified more, gas shielding, creep resistance, and mechanical strength of the separator can be assured, and electric resistance can be reduced. However, a thickness of the outer edge portion of the separator becomes thinner, and it is not easy to assure a required thickness of the outer edge portion of the separator.

According to the method of manufacturing a fuel cell separator of the present invention, a first sheet, which is formed with a main material containing, therein, expanded graphite material and binder, is prepared, and a second sheet, which is configured to face at least one of surfaces which are formed at an outer edge portion of the first sheet. The second sheet is arranged in contact with the at least one of surfaces which are formed at the outer edge portion of the first sheet. Surface passages are formed on the first sheet at the same time as pressure-bonding the first sheet and the second sheet by a pressurizing means.

Therefore, the separator is more densified in response to an increase in a compression amount of the separator. In this case, while gas shielding, creep resistance and mechanical resistance are assured, it is possible to assure a thickness of the outer edge portion of the separator. As described above, because it is easy to assure a required thickness of the outer edge portion of the separator, it is possible to increase a compression amount and to density the separator more, which is effective to reduce electric resistance.

According to the present invention, it is possible to supply a fuel cell separator, which excels in gas shielding, creep resistance and electric conductivity.

According to a method of manufacturing of the present invention, the steps of: preparing a first sheet, which is formed with a main material containing, therein, expanded graphite material and binder, and a second sheet configured to face at least one of surfaces which are formed at an outer edge portion of the first sheet; arranging the second sheet to contact with the at least one of surfaces which are formed at the outer edge portion of the first sheet; and forming a passage on the first sheet at the same time as pressure-bonding the first sheet and the second sheet by a pressurizing means, are implemented in order. The first sheet and the second sheet can be represented, as examples, by ones which are roll-molded or press-molded. One of the first sheet and the second sheet can be represented, as examples, by a laminated structure with plural layers. Further, it is possible to change contents, of the expanded graphite material, and of the binder, for each layer.

The first sheet is formed with a main material having expanded graphite material (carbonic material) and binder, which are combined therewith. The second sheet is formed with a main material having expanded graphite material (carbonic material) and binder, which are combined therewith. The expanded graphite material is a graphite in which intercalations of Carbon Hexagonal Plane(Graphene) were expanded. The expanded graphite material can be obtained by applying a heat to carbonic material such as natural graphite and by expanding the intercalations of Carbon Hexagonal Plane (Graphene) and an entire volume. The carbonic material can be reacted with acid prior to being heated. Because the expanded graphite material has been expanded, it possesses high compressibility and high mechanical entangle ability.

The binder can be represented, as an example, by a thermoplastic resin or a thermosetting resin. As the thermoplastic resin, a single, or a combination, of PolyVinylidine DiFluoride resin; Polyphenylene Sulfide resin; Polypropylene resin; Poly Arylate resin; Poly sulfone resin; Poly Phenylene Ether resin; Polycarbonate resin; Poly Olefin resin; Polyamide resin; Poly Ether Ketone resin; Polystyrene resin; Floro resin can be employed. Especially, a resin material, which exhibits a high heat resistance, such a PolyVinylidine DiFluoride resin, Polyphenylene Sulfide (PPS) and so on, and does not cause decomposition under a fuel cell operating atmosphere, is preferable. As the thermosetting resin, commonly used ones are employed.

As for electric resistance per unit volume, a separator can be employed, as an example, in which a specific volume electric resistance of the first sheet is set lower than that of the second sheet. Therefore, as for electric insulation, a separator can be employed, as an example, in which electric insulation of the second sheet is set higher than that of the first sheet. In other words, as for electric conductivity, a separator can be employed, as an example, in which electric conductivity of the first sheet is set higher than that of the second sheet. In this case, current collecting property using the first sheet having the surface passages, through which reactant fluid flows, can be assured preferably.

Considering a proportion or compounding ratio of the expanded graphite and the binder, assuming a total content of the expanded graphite material and the binder in the mixture composition is 100% by weight, a content of the binder contained therein can be, as needed, set within ranges of 5-60% by weight; 10-50% by weight, especially 20-40% by weight. However, the content thereof is not limited to the above. Here, If the content of the expanded graphite material is increased excessively, electric resistance is lowered and electric conductivity is assured, and yet there is a danger that mechanical strength may be reduced. Although mechanical strength can be assured if the content of the binder is increased excessively, there is a danger that electric conductivity may be lowered in response to an increase in electric resistance.

As for the content of the binder, a separator can be employed, as an example, in which the content of the binder of the second sheet is set higher than that of the first sheet. In this case, while electric conductivity of the first sheet is enhanced in response to a reduction of the content of the binder of the first sheet, a bonding performance between the first sheet and the second sheet can be also enhanced. Further, sometimes, a separator can be employed, as an example, in which a content of the binder of the second sheet is set lower than that of the first sheet. In this case, it is effective to prevent the second sheet from being adhered to the pressurizing means.

It is preferable that the content of the binder of a surface side of the first sheet having the surface passages is set relatively lower than that of an inside of the first sheet. In this case, the surface passages of the first sheet can be prevented from being adhered to the pressurizing means, and because the content of the binder at the surface side of the first sheet is set lower, it is effective to improve current collecting property using the first sheet. Also as for the second sheet, it is preferable that the content of the binder of a surface of the second sheet, which is positioned at an opposite side to the first sheet, is set relatively lower than that of an inside of the second sheet. In this case, the second sheet can be prevented from being adhered to the pressurizing means.

As for a content of the binder per unit volume of the second sheet, a separator is employed, as an example, in which a content of the binder per unit volume at a surface of the second sheet, which is positioned at an opposite side to the first sheet, is set lower than that at the other surface of the second sheet, which is positioned at the first sheet side. In this case, it is effective to enhance, by use of binder, a bonding performance between the first sheet and the second sheet.

As for the content of the binder, the content of the binder at the surface of the second sheet, which is positioned at an opposite side to the first sheet, is set relatively lower (including a state in which the content of the binder is zero) than that of the surface of the second sheet, which is positioned at the first sheet side. In this case, upon being pressurized, it is effective to prevent the second sheet from being adhered to the inner surface of the pressurizing die. In other words, the content of the binder at the surface of the second sheet, which is positioned at the first sheet side, is set relatively higher, it is effective to assure a bonding performance between the first sheet and the second sheet.

The method of the separator or the separator can be applicable for a fuel cell system for a vehicle; for firmly placing; for an electric equipment; for an electronic component; for a mobile phone; and so on.

The principles, the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A method of manufacturing a fuel cell separator, comprising the steps of:
  preparing a first sheet, which is formed with a main material containing, therein, expanded graphite material and binder, and a second sheet configured to face at least one of surfaces which are formed at an outer edge portion of the first sheet;
  arranging the second sheet to contact the first sheet only at the at least one of surfaces which are formed at the outer edge portion of the first sheet; and
  forming a passage on the first sheet at the same time as pressure-bonding the first sheet and the second sheet by a pressurizing means.

2. A method of manufacturing a fuel cell separator according to claim 1, wherein the binder is one of a thermoplastic resin and a thermosetting resin.

3. A method of manufacturing a fuel cell separator according to claim 1, wherein resistance per unit volume of the first sheet is set lower than electric resistance per unit volume of the second sheet.

4. A method of manufacturing a fuel cell separator according to claim 1, wherein a content of the binder of the first sheet is set higher than a content of the binder of the second sheet.

5. A method of manufacturing a fuel cell separator according to claim 1, wherein a content of the binder of the first sheet is set lower than a content of the binder of the second sheet.

6. A method of manufacturing a fuel cell separator according to claim 1, wherein a content of the binder at a surface of the first sheet is set lower than a content of the binder of an inside of the first sheet.

7. A method of manufacturing a fuel cell separator according to claim 4, wherein a content of the binder at a surface of the first sheet is set lower than a content of the binder of an inside of the first sheet.

8. A method of manufacturing a fuel cell separator according to claim 5, wherein a content of the binder at a surface of the first sheet is set lower than a content of the binder of an inside of the first sheet.

9. A method of manufacturing a fuel cell separator according to claim 1, wherein a content of the binder of a surface of the second sheet positioned at an opposite side to the first sheet is set lower than a content of the binder of an inside of the second sheet.

10. A method of manufacturing a fuel cell separator according to claim 4, wherein a content of the binder of a surface of the second sheet positioned at an opposite side to the first sheet is set lower than a content of the binder of an inside of the second sheet.

11. A method of manufacturing a fuel cell separator according to claim 5, wherein a content of the binder of a surface of the second sheet positioned at an opposite side to the first sheet is set lower than a content of the binder of an inside of the second sheet.

12. A method of manufacturing a fuel cell separator according to claim 1, wherein a content of the binder of a surface of the second sheet positioned at an opposite side to the first sheet is set lower than a content of the binder of a surface of the second sheet positioned at a side of the first sheet.

13. A method of manufacturing a fuel cell separator according to claim 4, wherein a content of the binder of a surface of the second sheet positioned at an opposite side to the first sheet is set lower than a content of the binder of a surface of the second sheet positioned at a side of the first sheet.

14. A method of manufacturing a fuel cell separator according to claim 5, wherein a content of the binder of a surface of the second sheet positioned at an opposite side to the first sheet is set lower than a content of the binder of a surface of the second sheet positioned at a side of the first sheet.

15. A method of manufacturing a fuel cell separator according to claim 1, wherein at least one of the first sheet and the second sheet is a laminated structure with plural layers.

16. A fuel cell separator, comprising:
a first sheet formed with a main material containing, therein, expanded graphite material and binder and having a passage through which reactant gas can flow; and
a second sheet formed with a main material containing, therein, expanded graphite material and binder and arranged to contact the first sheet only at least one of surfaces which are formed at an outer edge portion of the first sheet and arranged oppositely in a first direction, wherein
the first sheet and the second sheet are bonded together.

17. A method of manufacturing a fuel cell separator according to claim 1, wherein the second sheet is formed with a main material containing, therein, expanded graphite material and binder.

* * * * *